(12) United States Patent
Kong et al.

(10) Patent No.: US 9,634,297 B2
(45) Date of Patent: Apr. 25, 2017

(54) BATTERY CELL INCLUDING POUCH-TYPE CELL AND TRANSFORMED TO PRISMATIC SHAPE

(71) Applicant: LG CHEM, LTD., Seoul (KR)

(72) Inventors: Byung O Kong, Daejeon (KR); Dal Mo Kang, Daejeon (KR); Jun Yeob Seong, Daejeon (KR); Youngsop Eom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 286 days.

(21) Appl. No.: 14/566,475

(22) Filed: Dec. 10, 2014

(65) Prior Publication Data
US 2015/0099147 A1 Apr. 9, 2015

Related U.S. Application Data

(63) Continuation of application No. PCT/KR2013/006424, filed on Jul. 18, 2013.

(30) Foreign Application Priority Data

Jul. 23, 2012 (KR) ........................ 10-2012-0079861

(51) Int. Cl.
*H01M 2/02* (2006.01)
*H01M 2/10* (2006.01)
*H01M 2/30* (2006.01)
*H01M 2/12* (2006.01)

(52) U.S. Cl.
CPC ......... *H01M 2/021* (2013.01); *H01M 2/0217* (2013.01); *H01M 2/0275* (2013.01);
(Continued)

(58) Field of Classification Search
CPC .. H01M 2/021; H01M 2/0217; H01M 2/1072; H01M 2/0287; H01M 2/0275;
(Continued)

(56) References Cited

U.S. PATENT DOCUMENTS

| | | | |
|---|---|---|---|
| 2003/0215702 A1 | 11/2003 | Tanjou et al. | |
| 2006/0024574 A1* | 2/2006 | Yim ................... | H01M 2/1241 429/174 |

(Continued)

FOREIGN PATENT DOCUMENTS

| | | |
|---|---|---|
| JP | 5364650 B2 | 12/2013 |
| KR | 10-2007-0097143 A | 10/2007 |

(Continued)

OTHER PUBLICATIONS

Machine translation of 10-2009-0042683, retrieved from <http://kposd.kipo.go.kr:8088/up/kpion/> on Nov. 16, 2016.*

(Continued)

*Primary Examiner* — Cynthia K Walls
(74) *Attorney, Agent, or Firm* — Birch, Stewart, Kolasch & Birch, LLP (57) ABSTRACT

Disclosed herein is a prismatic battery cell including a pouch-shaped battery cell having an electrode assembly mounted in a pouch-shaped battery case, a cell case, in which the pouch-shaped battery cell is mounted, the cell case having a polyhedral shape, and a terminal case including external input and output terminals, to which electrode terminals of the pouch-shaped battery cell are coupled, the terminal case being coupled to one end of the cell case, the terminal case having a polyhedral shape.

19 Claims, 4 Drawing Sheets

(52) U.S. Cl.
CPC ....... *H01M 2/0277* (2013.01); *H01M 2/0285* (2013.01); *H01M 2/0287* (2013.01); *H01M 2/1061* (2013.01); *H01M 2/1072* (2013.01); *H01M 2/12* (2013.01); *H01M 2/30* (2013.01); *H01M 2/0212* (2013.01); *H01M 2/1205* (2013.01); *H01M 2220/30* (2013.01)

(58) Field of Classification Search
CPC .... H01M 2/0277; H01M 2/0285; H01M 2/12; H01M 2/30; H01M 2/1061; H01M 2/0212; H01M 2/1205; H01M 2220/30
See application file for complete search history.

(56) References Cited

U.S. PATENT DOCUMENTS

| 2007/0207377 | A1 | 9/2007 | Han et al. |
| 2007/0231687 | A1 | 10/2007 | Kim et al. |
| 2007/0232123 | A1 | 10/2007 | Uh |
| 2008/0193838 | A1 | 8/2008 | Oh |
| 2010/0136420 | A1 | 6/2010 | Shin et al. |
| 2013/0083453 | A1 | 4/2013 | Kobayashi |

FOREIGN PATENT DOCUMENTS

| KR | 10-2009-0042683 A | 4/2009 |
| KR | 2010-504622 A | 2/2010 |
| KR | 10-2012-0033044 A | 4/2012 |
| WO | WO 2007/091757 A1 | 8/2007 |
| WO | WO 2011/040297 A1 | 4/2011 |

OTHER PUBLICATIONS

International Search Report, issued in PCT/KR2013/006424, dated Oct. 24, 2013.

* cited by examiner

BATTERY CELL INCLUDING POUCH-TYPE CELL AND TRANSFORMED TO PRISMATIC SHAPE

CROSS REFERENCE TO RELATED APPLICATIONS:

This application is a Continuation of PCT International Application No. PCT/KR2013/006424, filed on Jul. 18, 2013, which claims priority under 35 U.S.C. 119(a) to Patent Application No. 10-2012-0079861, filed in the Republic of Korea on Jul. 23, 2012, all of which are hereby expressly incorporated by reference into the present application.

TECHNICAL FIELD

The present invention relates to a prismatic battery cell having a pouch-shaped battery cell mounted therein and, more particularly, to a prismatic battery cell including a pouch-shaped battery cell having an electrode assembly mounted in a pouch-shaped battery case, a cell case, in which the pouch-shaped battery cell is mounted, the cell case having a polyhedral shape, and a terminal case including external input and output terminals, to which electrode terminals of the pouch-shaped battery cell are coupled, the terminal case being coupled to one end of the cell case, the terminal case having a polyhedral shape.

BACKGROUND ART

As mobile devices have been increasingly developed and the demand for such mobile devices has increased, the demand for secondary batteries has also sharply increased as an energy source for the mobile devices. Among such secondary batteries is a lithium secondary battery having high energy density and discharge voltage, into which much research has been carried out and which is now commercially and widely used.

In general, a secondary battery is configured to have a structure in which an electrode assembly including a cathode, an anode, and a separator disposed between the cathode and the anode is mounted in a metal can or a battery case made of a laminate sheet in a stacked or wound state and an electrolyte is injected into the metal can or the battery case or the electrode assembly is impregnated with the electrolyte. Examples of the secondary battery with the above-stated construction include a cylindrical battery, a prismatic battery, and a pouch-shaped battery.

In recent years, much interest has been taken in a pouch-shaped battery configured to have a structure in which such a stacked or stacked/folded type electrode assembly is mounted in a pouch-shaped battery case made of an aluminum laminate sheet because of low manufacturing costs, light weight, easy modification in shape, etc. In addition, the use of such a pouch-shaped battery has gradually increased.

Meanwhile, small-sized mobile devices use one or several battery cells for each device. On the other hand, middle or large-sized devices, such as vehicles, use a battery pack having a plurality of battery cells electrically connected to each other because high output and large capacity are necessary for the middle or large-sized devices.

Preferably, the battery pack is manufactured so as to have as small a size and weight as possible. For this reason, it is necessary to provide a battery which can be stacked with a high integration. In recent years, a pouch-shaped battery, which has a small weight to capacity ratio, has been widely used. However, the pouch-shaped battery has lower extensibility than a prismatic battery when the pouch-shaped battery is assembled on a per module or pack basis. Conventionally, there has not been provided a structure that is capable of changing the pouch-shaped battery into the prismatic battery. As a result, it is difficult to manufacture a battery module or a battery pack using the pouch-shaped battery.

Furthermore, one of the important research problems is to improve safety of the pouch-shaped battery in addition to technology for changing the pouch-shaped battery into the prismatic battery in assembling on a per battery module or battery pack basis. For example, in a state in which an internal short circuit occurs in the secondary battery, in a state in which the secondary battery is overcharged with higher than allowable current and voltage, or in a state in which the secondary battery is abnormally operated due to exposure to high temperature, falling, or deformation caused by external impact, the electrolyte in the secondary battery is decomposed with the result that high-pressure gas is generated. The generated high-pressure gas may deform the battery case and shorten the lifespan of the battery. According to circumstances, the battery may be combusted or explode.

In order to prevent combustion or explosion of the battery when the high-pressure gas is generated and to efficiently discharge the gas, a structure in which the battery cell case is provided with a vent member configured to be ruptured when the pressure in the battery reaches a predetermined level for discharging the gas out of the battery cell, thereby preventing explosion of the battery cell has been used. However, the gas discharged from the battery cell contains toxic components. As a result, humans may be injured by the gas discharged from the battery cell.

Therefore, there is a high necessity for a battery cell configured to have a structure that is capable of improving extensibility in assembling on a per battery module or battery pack basis while exhibiting all advantages of the pouch-shaped battery and improving safety of the pouch-shaped battery.

DISCLOSURE

Technical Problem

Therefore, the present invention has been made to solve the above problems, and other technical problems that have yet to be resolved.

Specifically, it is an object of the present invention to provide a battery cell using a structure that is capable of changing a battery cell having a pouch-shaped structure into a battery cell having a prismatic structure, thereby improving extensibility in assembling on a per battery module or battery pack basis.

It is another object of the present invention to provide a battery cell configured to have a structure that is capable of collecting gas generated from the battery cell on a per module or pack basis and discharging the collected gas to an intended position, thereby preventing explosion of the battery cell due to the gas generated from the battery cell.

Technical Solution

In accordance with one aspect of the present invention, the above and other objects can be accomplished by the provision of a prismatic battery cell including a pouch-shaped battery cell having an electrode assembly mounted in a pouch-shaped battery case, a cell case, in which the pouch-shaped battery cell is mounted, the cell case having a polyhedral shape, and a terminal case including external input and output terminals, to which electrode terminals of the pouch-shaped battery cell are coupled, the terminal case being coupled to one end of the cell case, the terminal case having a polyhedral shape.

According to the present invention, the prismatic battery cell includes the cell case, by which the pouch-shaped battery cell is changed into the prismatic battery cell. Consequently, extensibility is improved in assembling on a per battery module or battery pack basis such that the prismatic battery cell according to the present invention can be configured to have various structures.

In addition, durability and rigidity of the pouch-shaped battery cell, which has low resistance to external impact and vibration, are increased with the result that structural stability of the battery cell is improved.

In an example, the pouch-shaped battery cell may be configured to have a plate-shaped structure in which an outer edge of the pouch-shaped battery cell is sealed in a state in which the electrode assembly is mounted in the pouch-shaped battery cell.

For example, the battery case of the pouch-shaped battery cell may be a pouch-shaped case made of a laminate sheet including a resin layer and a metal layer. That is, the battery case may be made of a laminate sheet including an outer resin layer exhibiting high durability, a metal blocking layer, and a resin sealant layer exhibiting a high thermal bonding property. The resin sealant layer may be thermally bonded.

It is required for the outer resin layer to exhibit high resistance against external environment. For this reason, it is necessary for the outer resin layer to exhibit more than predetermined tensile strength and weather resistance. To this end, the outer resin layer may be made of a polymer resin, such as polyethylene terephthalate (PET) or oriented nylon film. However, the present invention is not limited thereto.

It is required for the metal blocking layer to have a function to improve strength of the battery case in addition to a function to prevent introduction or leakage of foreign matter, such as gas or moisture. To this end, the metal blocking layer may be made of, for example, aluminum.

The resin sealant layer may be made of a polyolefin resin which exhibits a high thermal bonding property (thermal adhesive property) and a low hygroscopic property, which is necessary to restrain permeation of an electrolyte, and is not expanded or is not corroded by the electrolyte. In a concrete example, the resin sealant layer may be made of cast polypropylene (CPP).

As previously described, the cell case and the terminal case each have a polyhedral shape such that the pouch-shaped battery cell is configured to have a prismatic structure and thus can be used to manufacture a battery module. Examples of the polyhedral shape may include a tetrahedral shape, a pentahedral shape, a hexahedral shape, and an octahedral shape. In a concrete example, the cell case and the terminal case each may have a hexahedral shape.

In a concrete example, the cell case may include a first case mounted at one major surface of the pouch-shaped battery cell and a second case mounted at the other major surface of the pouch-shaped battery cell. The first case and the second case may be provided with a mutual fastening structure such that the first case and the second case can be coupled to each other in tight contact in a state in which the pouch-shaped battery cell is mounted between the first case and the second case For example, one of the first and second cases may be provided with one or more fastening members and the other of the first and second cases may be provided with fastening grooves corresponding to the fastening members. Consequently, the first case and the second case can be coupled to each other by engagement between the fastening members and the fastening grooves.

Specifically, each of the fastening members may be configured to have a hook structure and each of the fastening grooves may be configured to have a shape corresponding to the hook structure.

The first case and the second case each may be configured to have a structure comprising an opening, through which each major surface of the pouch-shaped battery cell is exposed when the first case and the second case are coupled to each other while covering an outer edge of the pouch-shaped battery cell. In a case in which the opening is provided at each of the first and second cases, the volume of pouch-shaped battery cells is reduced when the pouch-shaped battery cells are stacked with the result that the stack of the pouch-shaped battery cells may have a compact structure. In addition, each opening may be used as a space for heat dissipation or a cooling member may be disposed between the respective battery cells through each opening to improve cooling efficiency. Furthermore, each opening provides a space in which the battery cell can expand when a swelling phenomenon occurs due to continuous use or abnormal operation of the battery cell.

The external input and output terminals of the battery cell may be configured to have various structures. For example, the external input and output terminals each may be configured to have an insert bolt structure. That is, when a battery module or a battery pack is manufactured using one or more battery cells, the external input and output terminals, each of which is configured to have the insert bolt structure, of the battery cells may be coupled into insert nuts provided at a bus bar or a protection circuit module by fastening. However, the structure of each of the external input and output terminals is not limited to the insert bolt structure. For example, each of the external input and output terminals may be formed in a plate-shaped structure or a linear structure, which can be coupled by various coupling methods, such as welding and soldering.

Meanwhile, the terminal case may further include terminal coupling parts connected to the electrode terminals protruding from the pouch-shaped battery cell and electrically connected to the external input and output terminals. The terminal coupling parts may be electrically connected to the electrode terminals by welding.

The terminal case may further include a vent plug for discharging gas generated from the battery cell due to abnormal operation of the battery cell. The vent plug may be configured to have a structure that is capable of discharging gas generated from the pouch-shaped battery cell in a predetermined direction. That is, when a sealed portion of the pouch-shaped battery cell due to abnormal operation of the pouch-shaped battery cell with the result that gas is discharged from the pouch-shaped battery cell, the gas is guided to the outside of the battery cell through the vent plug of the terminal case such that the gas can be discharged to the outside of the battery cell.

In a case in which the above structure is provided, the gas discharge position of the battery cell is uniform when a battery module or a battery pack including the battery cell according to the present invention is manufactured. According to circumstances, a structure that is capable of collecting gas may be further provided at the gas discharge position. In addition, a secondary vent structure may be further provided at the gas collecting structure.

The external input and output terminals, the terminal coupling parts, and the vent plug of the terminal case may be integrally coupled to one another by insert injection molding.

Meanwhile, the terminal case and the cell case may have the same thickness and width such that, when battery cells are stacked, the volume of the stacked structure of the battery cells can be reduced.

In accordance with other aspects of the present invention, there are provided a battery module including two or more prismatic battery cells with the above-stated construction and a battery pack including one or more battery modules mounted in a pack case.

The battery module or the battery pack may be used in a device, such as a mobile phone, a portable computer, a smart phone, a smart pad, a netbook computer, a light electronic vehicle (LEV), an electric vehicle, a hybrid electric vehicle, a plug-in hybrid electric vehicle, or a power storage device, which requires a long lifespan and high durability in consideration of structural stability.

In accordance with a further aspect of the present invention, there is provided a device including the battery module or the battery pack as a power source. Specifically, the device may be a mobile phone, a portable computer, a smart phone, a smart pad, a netbook computer, a light electronic vehicle (LEV), an electric vehicle, a hybrid electric vehicle, a plug-in hybrid electric vehicle, or a power storage device.

The structure of the device and a method of manufacturing the device are well known in the art to which the present invention pertains and, therefore, a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
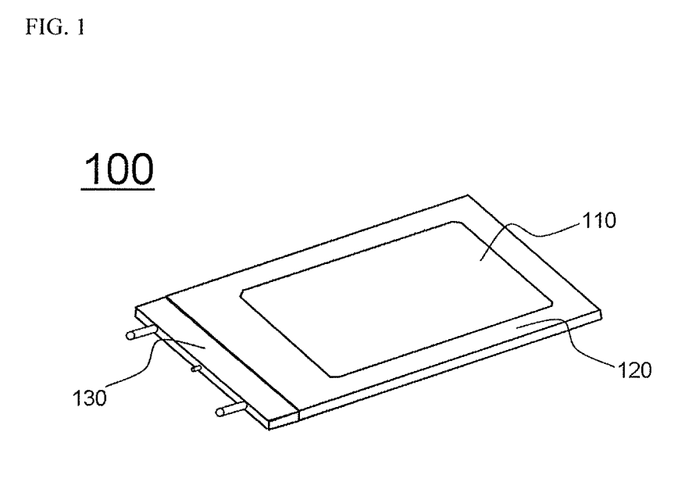
FIG. 1 is a perspective view showing a prismatic battery cell according to an embodiment of the present invention.
Figure 2:
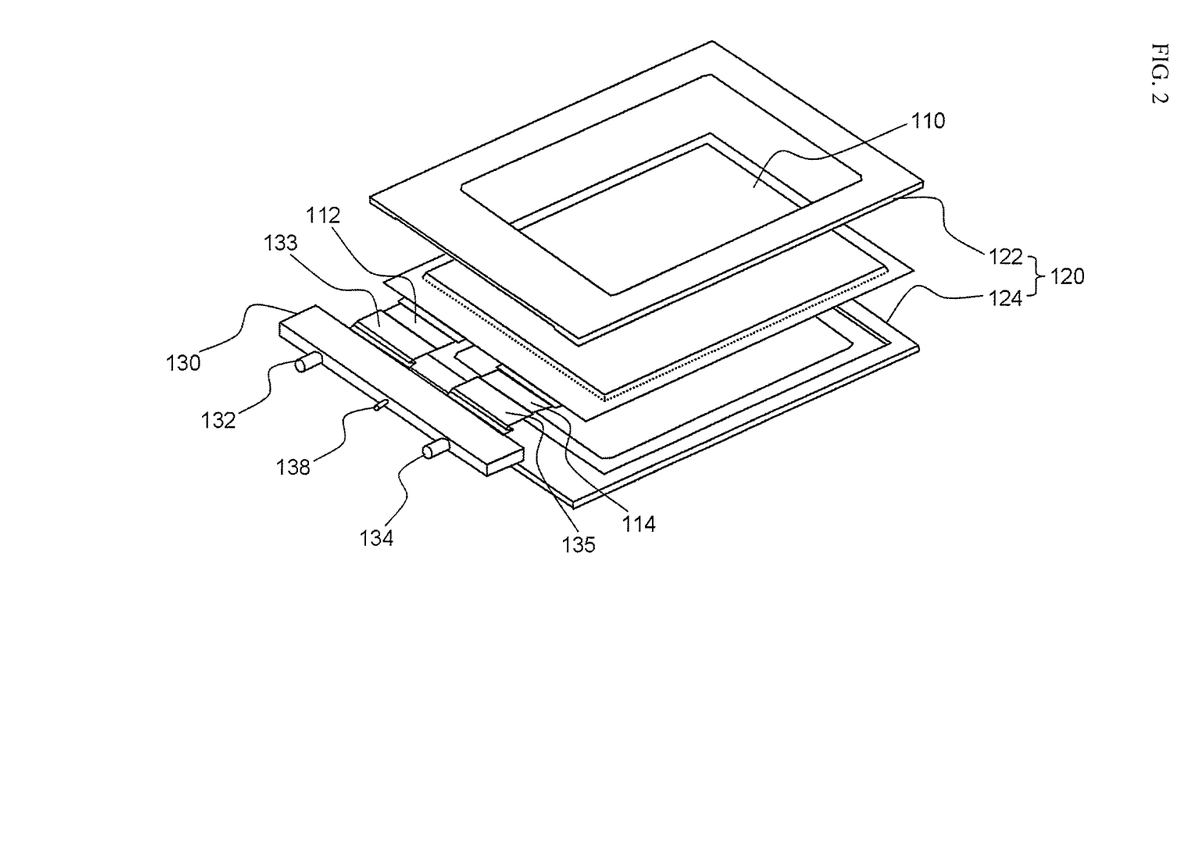
FIG. 2 is an exploded perspective view of the prismatic battery cell shown in FIG. 1.

FIG. 1 is a perspective view showing a prismatic battery cell according to an embodiment of the present invention and FIG. 2 is an exploded perspective view of the prismatic battery cell shown in FIG. 1.

Referring to FIGS. 1 and 2, a prismatic battery cell 100 is configured to have a structure including a pouch-shaped battery cell 110, a cell case 120, in which the pouch-shaped battery cell 110 is mounted, and a terminal case 130 coupled to one end of the cell case 120.

The pouch-shaped battery cell 110 is configured to have a plate-shaped structure in which an electrode assembly is mounted in a pouch-shaped case made of a laminate sheet. The cell case 120 includes a first case 122 and a second case 124. When the first case 122 and the second case 124 are coupled to the outside of the pouch-shaped battery cell 110, the first case 122 and the second case 124 form a hexahedral shape.

The terminal case 130 is coupled to one end of the cell case 120. The terminal case 130 includes external input and output terminals 132 and 134, which are electrically connected to electrode terminals 112 and 114 of the pouch-shaped battery cell 110, respectively. The terminal case 130 is formed in a hexahedral shape.

Figure 3:
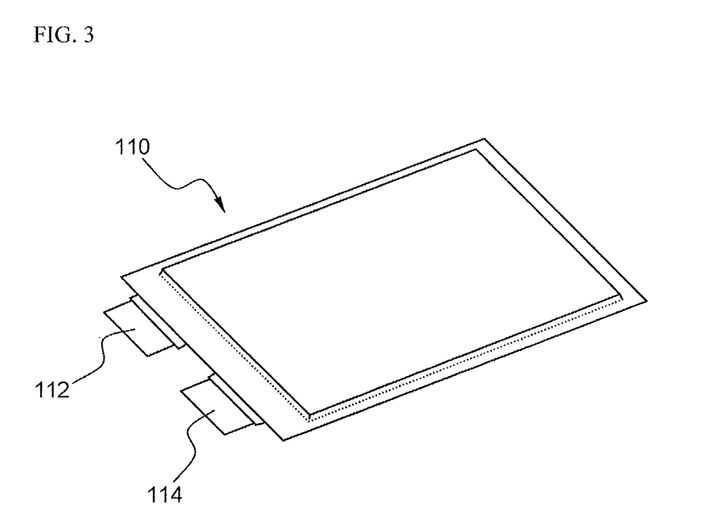
FIG. 3 is a perspective view showing a pouch-shaped battery cell of the present invention.
Figure 4:
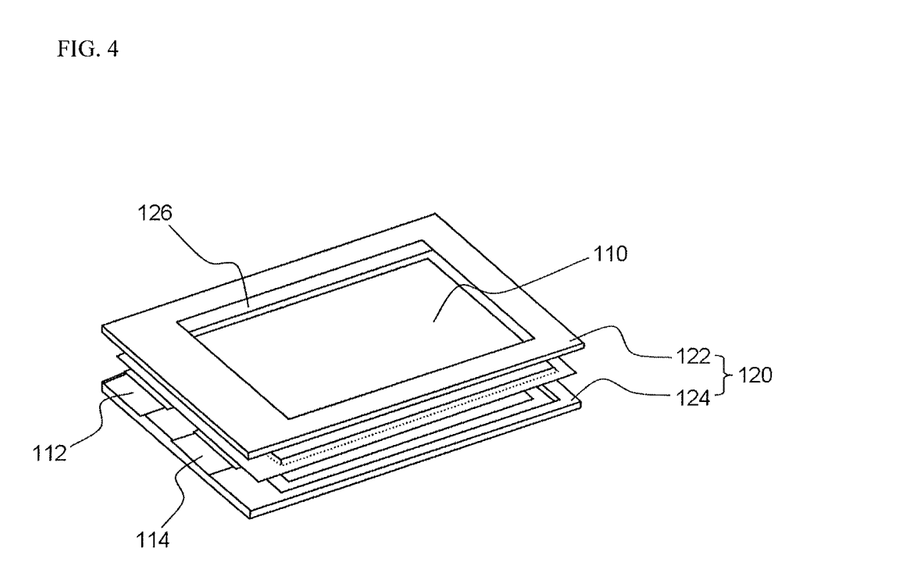
FIG. 4 is a perspective view showing the pouch-shaped battery cell and a cell case of the present invention.

FIG. 3 is a perspective view showing the pouch-shaped battery cell of FIG. 2 and FIG. 4 is a perspective view showing a structure in which the cell case is coupled to the pouch-shaped battery cell of FIG. 3.

Referring to FIGS. 3 and 4 together with FIG. 2, the pouch-shaped battery cell 110 is configured to have a plate-shaped structure in which an outer edge of the pouch-shaped battery cell 110 is sealed in a state in which an electrode assembly (not shown) is mounted in the pouch-shaped battery cell 110. The electrode terminals 112 and 114 protrude from one end of the pouch-shaped battery cell 110 such that the electrode terminals 112 and 114 are connected to terminal coupling parts 133 and 135 of the terminal case 130.

The cell case 120 includes a first case 122 mounted at the upper major surface of the pouch-shaped battery cell 110 and a second case 124 mounted at the lower major surface of the pouch-shaped battery cell 110. The first case 122 and the second case 124 each include an opening 126, through which each major surface of the pouch-shaped battery cell 110 is exposed when the first case 122 and the second case 124 are coupled to each other. Consequently, the first case 122 and the second case 124 cover the outer edge of the pouch-shaped battery cell 110 when the first case 122 and the second case 124 are coupled to each other. The opening 126 enables discharge of heat generated during charge and discharge of the pouch-shaped battery cell 110 and provides a space in which the pouch-shaped battery cell 110 can expanded when a swelling phenomenon occurs. The cell case 120 is made of an insulative material. In addition, the cell case 120 protects the pouch-shaped battery cell 110 from external impact.

Figure 5:
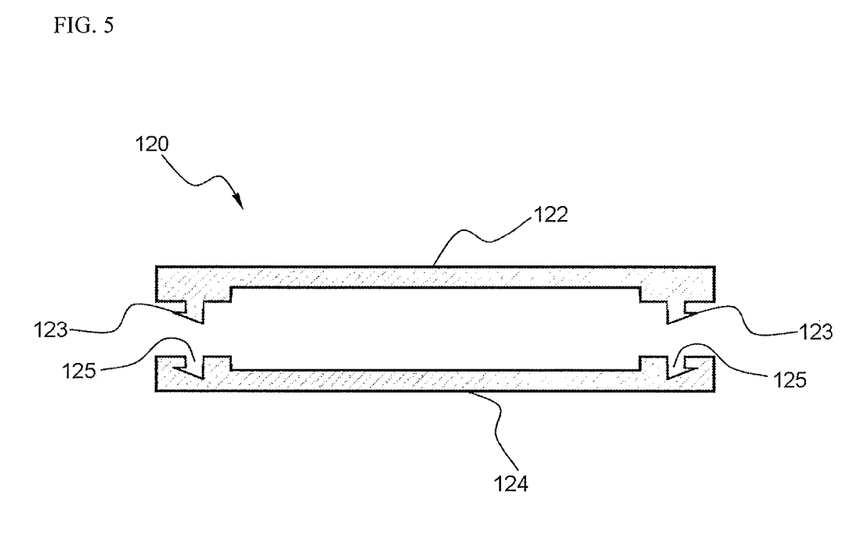
FIG. 5 is a vertical sectional view showing a fastening structure of the cell case of the present invention.

FIG. 5 is a vertical sectional view showing a fastening structure of the cell case of FIG. 1.

Referring to FIG. 5, the cell case 120 is coupled based on a mutual fastening structure. The first case 122 is provided along an outer edge thereof with fastening members 123 and the second case 124 is provided with fastening grooves 125 corresponding to the fastening members 123. When the first case 122 and the second case 124 are pushed to each other in a state in which the first case 122 and the second case 124 face each other, the fastening members 123 are inserted into the fastening grooves 125. As a result, the fastening members 123 are engaged into the respective fastening grooves 125 and, therefore, the first case 122 and the second case 124 are coupled to each other.

Figure 6:
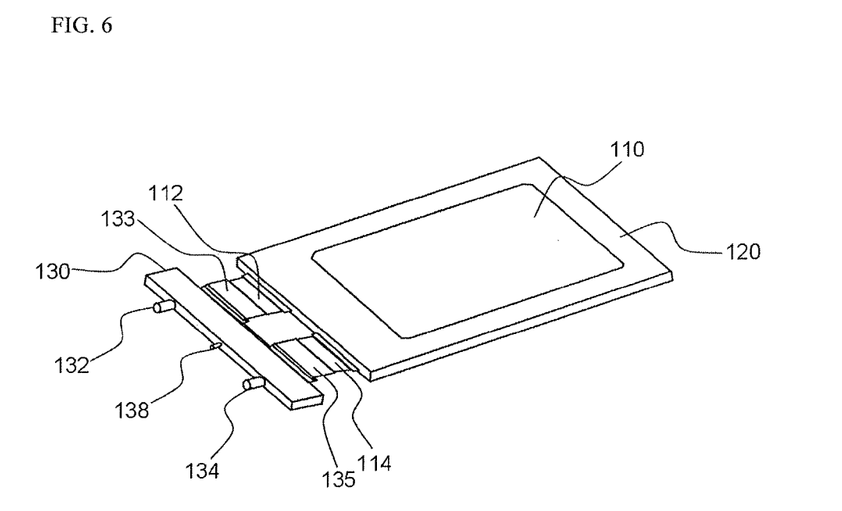
FIG. 6 is a perspective view showing a structure in which the pouch-shaped battery cell, to which the cell case of the present invention is mounted, and a terminal case are coupled to each other.

FIG. 6 is a perspective view showing a structure in which the pouch-shaped battery cell, to which the cell case is mounted, and the terminal case are coupled to each other.

Referring to FIG. 6, the terminal case 130 is coupled to one end of the cell case 120 at the end of the pouch-shaped battery cell 110 at which the electrode terminals 112 and 114 are formed. The external input and output terminals 132 and 134, a vent plug 138, and the terminal coupling parts 133 and 135 of the terminal case 130 are integrally coupled to one another by insert injection molding.

The external input and output terminals 132 and 134 are formed at opposite sides of the front of the terminal case 130. The terminal coupling parts 133 and 135 of the terminal case 130 are electrically connected to the electrode terminals 112 and 114 of the pouch-shaped battery cell 110 by welding. The external input and output terminals 132 and 134 each are configured to have an insert bolt structure. Consequently, the external input and output terminals 132 and 134 are easily coupled to an external structure including insert nuts.

The vent plug 138 formed at the terminal case 130 discharges gas generated from the pouch-shaped battery cell 110 to the outside in a predetermined direction.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a prismatic battery cell according to the present invention uses a structure that is capable of changing a battery cell having a pouch-shaped structure into a battery cell having a prismatic structure. Consequently, the present invention has the effect of improving extensibility in assembling on a per battery module or battery pack basis. In addition, the prismatic battery cell according to the present invention is configured to have a structure that is capable of collecting and discharging gas generated from the battery cell on a per module or pack basis. Consequently, the present invention has the effect of improving safety of the battery cell.

The invention claimed is:

1. A prismatic battery cell comprising:
a pouch-shaped battery cell having an electrode assembly mounted in a pouch-shaped battery case, the battery cell having a first major surface and a second major surface spaced from the first major surface;
a cell case, in which the pouch-shaped battery cell is mounted, the cell case having a top wall having a first central opening and a bottom wall having a second central opening; and
a terminal case comprising external input and output terminals, to which electrode terminals of the pouch-shaped battery cell are coupled, the terminal case being coupled to one end of the cell case, the terminal case having a polyhedral shape,
wherein the first major surface of the battery cell extends into the first central opening and is coplanar with the top wall and the second major surface of the battery cell extends into the second central opening and is coplanar with the bottom wall.

2. The prismatic battery cell according to claim 1, wherein the pouch-shaped battery case is made of a laminate sheet comprising a resin layer and a metal layer.

3. The prismatic battery cell according to claim 1, wherein the pouch-shaped battery cell is configured to have a plate-shaped structure in which an outer edge of the pouch-shaped battery cell is sealed in a state in which the electrode assembly is mounted in the pouch-shaped battery cell.

4. The prismatic battery cell according to claim 1, wherein the cell case has a hexahedral shape.

5. A prismatic battery cell comprising:
a pouch-shaped battery cell having an electrode assembly mounted in a pouch-shaped battery case;
a cell case, in which the pouch-shaped battery cell is mounted, the cell case having a polyhedral shape; and
a terminal case comprising external input and output terminals, to which electrode terminals of the pouch-shaped battery cell are coupled, the terminal case being coupled to one end of the cell case, the terminal case having a polyhedral shape,
wherein the cell case comprises a first case mounted at one major surface of the pouch-shaped battery cell and a second case mounted at the other major surface of the pouch-shaped battery cell.

6. The prismatic battery cell according to claim 5, wherein the first case and the second case are coupled to each other based on a mutual fastening structure.

7. The prismatic battery cell according to claim 6, wherein one of the first and second cases is provided with one or more fastening members, and the other of the first and second cases is provided with fastening grooves corresponding to the fastening members.

8. The prismatic battery cell according to claim 5, wherein the first case and the second case each is configured to have a structure comprising an opening, through which each major surface of the pouch-shaped battery cell is exposed when the first case and the second case are coupled to each other while covering an outer edge of the pouch-shaped battery cell.

9. A prismatic battery cell comprising:
a pouch-shaped battery cell having an electrode assembly mounted in a pouch-shaped battery case;
a cell case, in which the pouch-shaped battery cell is mounted, the cell case having a polyhedral shape; and
a terminal case comprising external input and output terminals, to which electrode terminals of the pouch-shaped battery cell are coupled, the terminal case being coupled to one end of the cell case, the terminal case having a polyhedral shape,
wherein the external input and output terminals each are configured to have an insert bolt structure.

10. The prismatic battery cell according to claim 1, wherein the terminal case has a hexahedral shape.

11. The prismatic battery cell according to claim 1, wherein the terminal case further comprises terminal coupling parts connected to the external input and output terminals and connected to the electrode terminals of the pouch-shaped battery cell.

12. The prismatic battery cell according to claim 1, wherein the terminal case further comprises a vent plug for discharging gas generated from the pouch-shaped battery cell.

13. A prismatic battery cell comprising:
a pouch-shaped battery cell having an electrode assembly mounted in a pouch-shaped battery case;
a cell case, in which the pouch-shaped battery cell is mounted, the cell case having a polyhedral shape; and
a terminal case comprising external input and output terminals, to which electrode terminals of the pouch-shaped battery cell are coupled, the terminal case being coupled to one end of the cell case, the terminal case having a polyhedral shape, wherein the terminal case further comprises a vent plug for discharging gas generated from the pouch-shaped battery cell, and wherein the external input and output terminals, terminal coupling parts, and the vent plug of the terminal case are integrally coupled to one another by insert injection molding.

14. A prismatic battery cell comprising:

a pouch-shaped battery cell having an electrode assembly mounted in a pouch-shaped battery case;

a cell case, in which the pouch-shaped battery cell is mounted, the cell case having a polyhedral shape; and a terminal case comprising external input and output terminals, to which electrode terminals of the pouch-shaped battery cell are coupled, the terminal case being coupled to one end of the cell case, the terminal case having a polyhedral shape, wherein the terminal case and the cell case have the same thickness and width.

15. A battery module comprising two or more prismatic battery cells according to claim 1.

16. A battery pack comprising one or more battery modules according to claim 15 mounted in a pack case.

17. A device comprising a battery module according to claim 15.

18. The device according to claim 17, wherein the device is selected from among a mobile phone, a portable computer, a smart phone, a smart pad, a netbook computer, a light electronic vehicle (LEV), an electric vehicle, a hybrid electric vehicle, a plug-in hybrid electric vehicle, and a power storage device.

19. The prismatic battery cell according to claim 1, further comprising a sealed outer edge extending from the pouch-shaped battery cell and located between the first major surface and the second major surface, wherein the sealed outer edge contacts a bottom surface of the top wall of the cell case and a top surface of the bottom wall of the cell case.

* * * * *